United States Patent [19]
Barthomeuf

[11] Patent Number: 5,056,606

[45] Date of Patent: Oct. 15, 1991

[54] DAMPED HAMMER DRILL

[75] Inventor: Jean-Claude Barthomeuf, Anse, France

[73] Assignee: Eimco-Secoma (Societe Anonyme), Meyzieu, France

[21] Appl. No.: 530,551

[22] Filed: May 29, 1990

[30] Foreign Application Priority Data

Jun. 6, 1989 [FR] France .............................. 89 08136

[51] Int. Cl.$^5$ .............................................. B23Q 5/00

[52] U.S. Cl. ...................................... 173/13; 173/131; 173/138

[58] Field of Search ..................... 173/139, 135, 162.1, 173/134, 138, 125, 116, 13–17

[56] References Cited

U.S. PATENT DOCUMENTS

| | | | |
|---|---|---|---|
| 4,308,926 | 1/1982 | Montabert | 173/139 R |
| 4,363,365 | 12/1982 | Nikolaeu et al. | 173/139 |

FOREIGN PATENT DOCUMENTS

| | | | |
|---|---|---|---|
| 80446 | 6/1983 | European Pat. Off. . | |
| 133161 | 2/1985 | European Pat. Off. . | |
| 2596681 | 10/1987 | France . | |
| 2598111 | 11/1987 | France . | |
| 1154593 | 6/1969 | United Kingdom | 173/139 |

*Primary Examiner*—Timothy V. Eley
*Assistant Examiner*—William Fridie, Jr.
*Attorney, Agent, or Firm*—Herbert Dubno; Andrew Wilford

[57] ABSTRACT

A fluid-powered hammer drill has a bore in which a tool shaft is normally coaxially engaged. A piston displaceable in the bore defines a front return chamber of small effective piston surface area and a rear drive chamber of larger effective surface area. A passage permanently connects the front chamber with the high-pressure side of a pressure source. A reversible control valve is connected between both sides of the source and the rear chamber for alternately pressurizing and depressurizing same and thereby alternately displacing the piston axial forward to strike the rear end of the tool shaft and axially backward. A recoil-damping sleeve surrounds the piston axially ahead of the front chamber and has a front end axially forwardly engageable with the tool shaft in a frontmost position and a rear end defining with the bore a recoil chamber separate from the front return chamber. The housing is formed with a vent passage connected to the low-pressure side of the source and opening into the recoil chamber. This vent passage is uncovered by the sleeve for venting of the recoil chamber substantially only when the sleeve is in the frontmost position. The piston is formed with at least one bypass passage communicating for fluid flow between the recoil and front chambers when the piston is in or axially forward of its front position but blocked when the piston is axially backward of its front position.

8 Claims, 3 Drawing Sheets

FIG.6
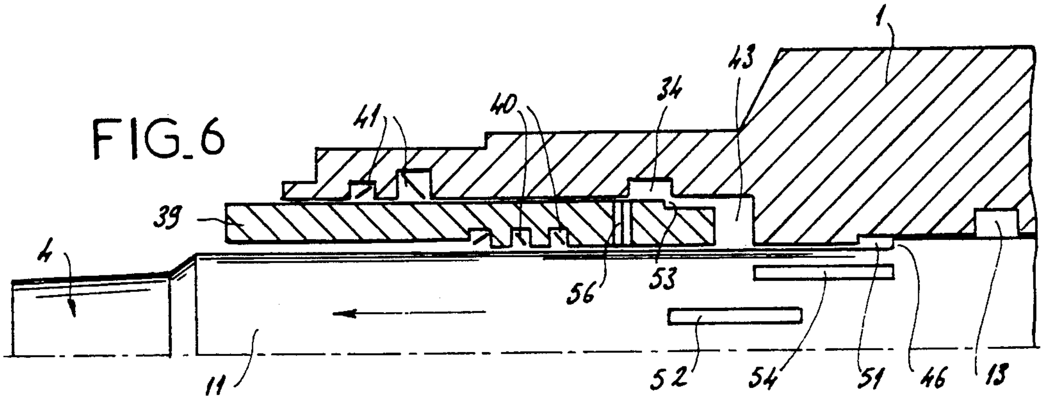
FIG.7
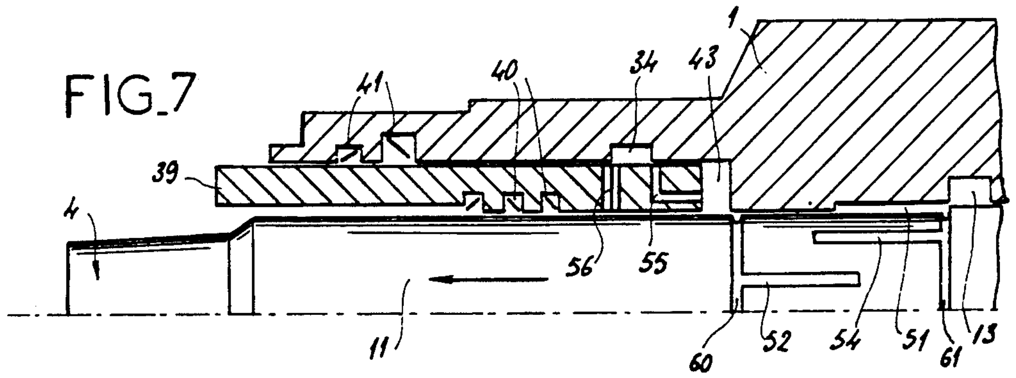
FIG.9
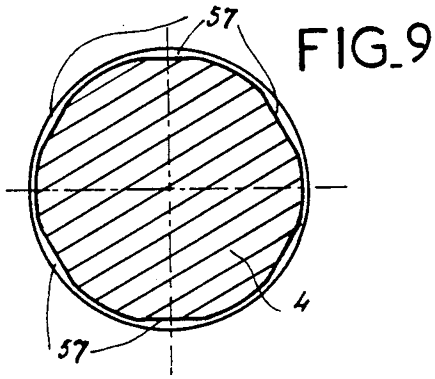
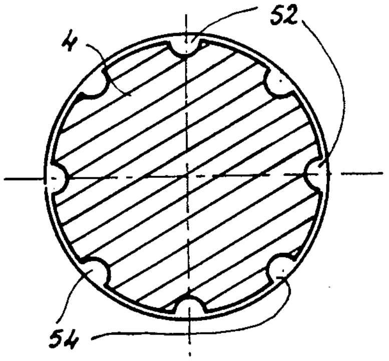
FIG.8

DAMPED HAMMER DRILL

FIELD OF THE INVENTION

The present invention relates to a hydraulic hammer drill. More particularly this invention concerns such a drill having damping for the recoil on the tool being driven.

BACKGROUND OF THE INVENTION

A percussion hammer such as described in French patent 2,596,681 is used with a pressure source having a high-pressure side and a low-pressure side and with a tool having a shaft with a rear end. This hammer has a housing formed with an axis-defining bore having a front end in which the tool shaft is normally coaxially engaged. A piston coaxially displaceable in the bore has a forwardly directed face defining in the bore a front return chamber of small effective piston surface area, and a rearwardly directed face defining in the bore a rear drive chamber of larger effective surface area. The front chamber is permanently connected with the high pressure side of a pressure source and a reversible control valve is connected between both sides of this source and the rear chamber for alternately pressurizing and depressurizing the rear chamber and thereby alternately displacing the piston axially forward to a front position in which it strikes the rear end of the tool shaft and axially backward away from the tool. At least one recoil-damping sleeve surrounds the piston axially ahead of the front chamber and has a front end operatively engageable axially forwardly with the tool shaft and a rear end defining with-the bore and with the piston front face a recoil chamber separated from the front return chamber when the piston is in or axially forward of its front position and communicating therewith when the piston is axially backward of its front position.

Thus with this system the recoil chamber is completely closed when the piston is in its front position when a recoil shock wave is generated, but opens into the front chamber once the piston moves back. The energy of the recoil shock wave is transmitted to the fluid in this chamber by the recoil sleeve or sleeves, thereby damping this force and eliminating noise and vibration. In addition a portion of the energy damped is transmitted to the piston at its front face so that it is actually used to start the piston on its return stroke. This energy is therefore used to do some necessary work and is not wasted.

Once the piston has recoiled a little the recoil chamber is opened up into the front return chamber so that it does not need its own fluid-feed passage. This simplifies the construction of the apparatus. Furthermore due to the location of this recoil chamber right next to the front return chamber it does not complicate the machine by making it necessary to build it larger.

The sleeve is constituted by a front sleeve having a front end in operative engagement with the tool shaft, an intermediate sleeve having inner and outer seals respective bearing on the piston and bore, and a rear sleeve having a rear end forwardly axially delimiting the recoil chamber. The front sleeve has cylindrical front and rear portions joined by a frustoconical intermediate portion. The tool shaft has an enlarged region and the recoil sleeve directly engages same. In addition or alternately the device comprises a drive element rotatable in the housing about the axis and rotationally but not axially coupled to the tool shaft and the sleeve directly engages this drive element.

Such an arrangement has the disadvantage that the rotary parts turning the bit are frequently subjected to considerable hammering. When there is no tool in the device or the tool is out of contact with the workpiece, the sleeve can push forward against the rotating drill, causing considerable wear.

OBJECTS OF THE INVENTION

It is therefore an object of the present invention to provide an improved rotary hammer drill.

Another object is the provision of such an improved rotary hammer drill which overcomes the above-given disadvantages, that is which protects the rotary drive elements even when there is no bit in the drill, and which effectively damps recoil.

SUMMARY OF THE INVENTION

A fluid-powered hammer drill used in combination with a pressure source having a high-pressure side and a low-pressure side and with a tool having a shaft with a rear end has a housing formed with an axis-defining bore having a front end in which the tool shaft is normally coaxially engaged. A piston coaxially displaceable in the bore has a forwardly directed face defining in the bore a front return chamber of small effective piston surface area, and a rearwardly directed face defining in the bore a rear drive chamber of larger effective surface area. A passage permanently connects the front chamber with the high-pressure side of the source. A reversible control valve is connected between both sides of the source and the rear chamber for alternately pressurizing and depressurizing the rear chamber and thereby alternately displacing the piston axial forward to a front position in which it strikes the rear end of the tool shaft and axially backward away from the tool. At least one recoil-damping sleeve surrounds the piston axially ahead of the front chamber and has a front end axially forwardly operatively engageable with the tool shaft in a frontmost position and a rear end defining with the bore a recoil chamber separated from the front return chamber. The housing is formed with a vent passage connected to the low-pressure side of the source and opening into the recoil chamber. This vent passage is uncovered by the sleeve for venting of the recoil chamber substantially only when the sleeve is in the frontmost position. The piston is formed wit at least one bypass passage communicating for fluid flow between the recoil and front chambers when the piston is in or axially forward of its front position but blocked when the piston is axially backward of its front position.

Thus with this system the front recoil chamber is isolated when the hammer piston is back and out of contact with the tool. It is pressurized from the front chamber of the cylinder when the piston-moves forward to strike the tool and when it recoils back therefrom, the latter via the bypass passage in the piston. The recoil chamber is vented before the sleeve itself comes into engagement with the tool or the sleeve rotating it to eliminate hammering when the tool is out of contact with the workpiece.

According to another feature of this invention the piston is formed with another such bypass passage axially rearward of the first-mentioned bypass passage. Thus when there is no tool in the hammer drill and the piston moves forward past its front position, the front chamber is vented to the low-pressure side of the source through the other bypass passage.

In accordance with another feature of this invention the sleeve is formed with a shoulder that is slightly axially forward of the vent passage in the frontmost position of the sleeve. It can also be formed with an internal passage that opens into the vent passage and into the recoil chamber in the frontmost position of the sleeve. Furthermore the bypass passage can be formed by a plurality of axial outwardly open grooves which themselves are interconnected by an annular groove.

DESCRIPTION OF THE DRAWING

The above and other objects, features, and advantages will become more readily apparent from the following, reference being made to the accompanying drawing in which:

FIGS. 2 through 6 are views of details of the drill in different positions;

FIG. 7 is a detail view like FIGS. 2 through 6 but showing an alternative arrangement according to the invention;

FIG. 8 is a cross section through the piston of this invention; and

FIG. 9 is a view like FIG. 8 of another piston according to the invention.

SPECIFIC DESCRIPTION

Figure 1:
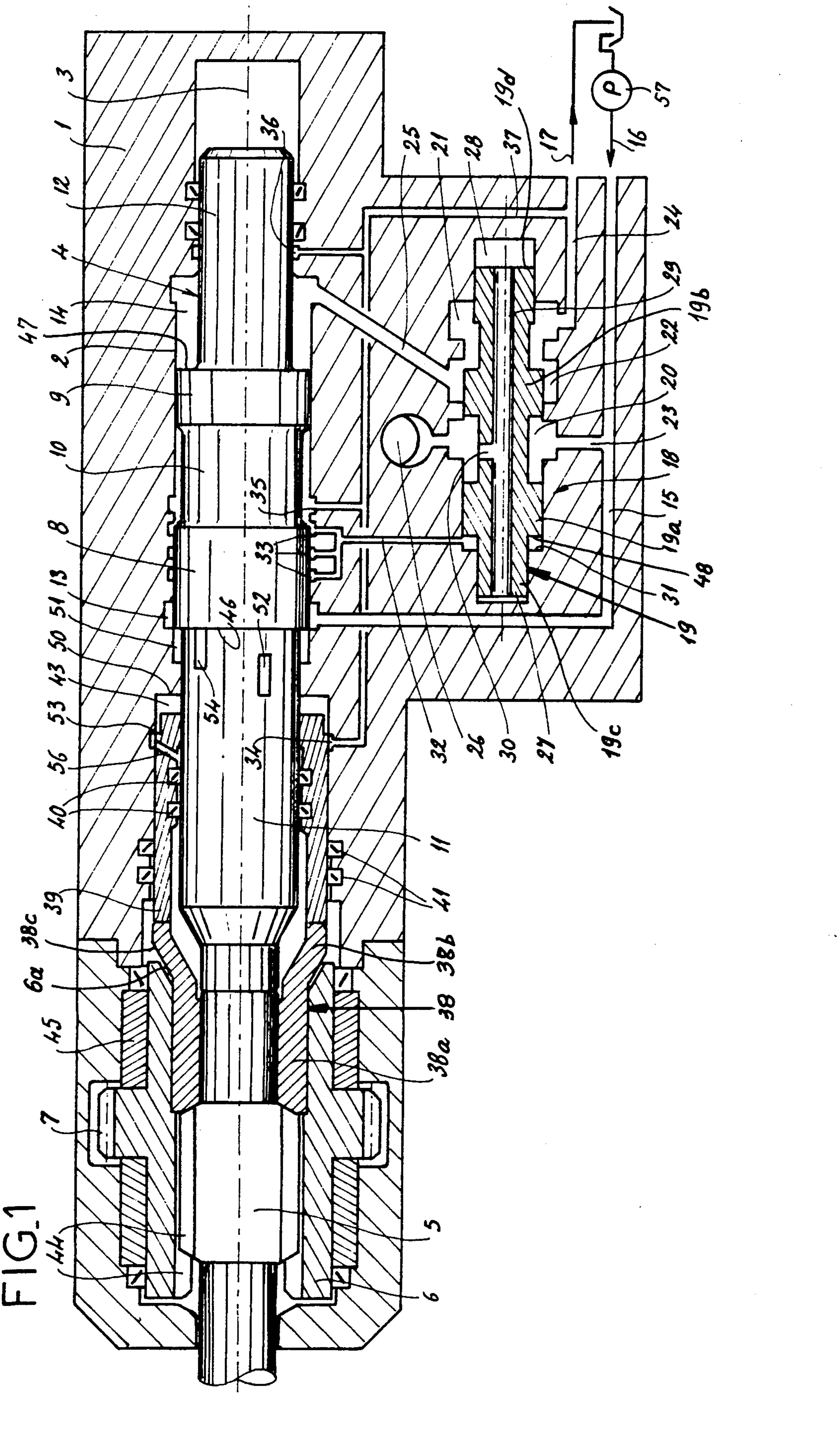
FIG. 1 is a partly diagrammatic axial section through a hammer drill according to this invention.
Figure 2:
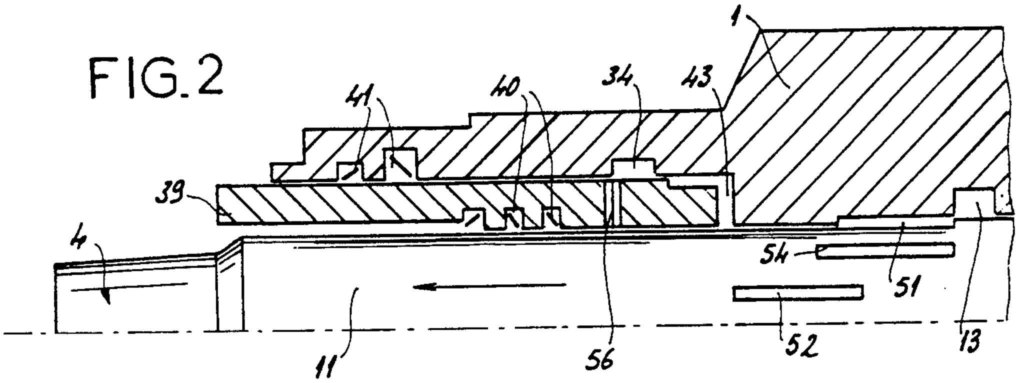
Figure 3:
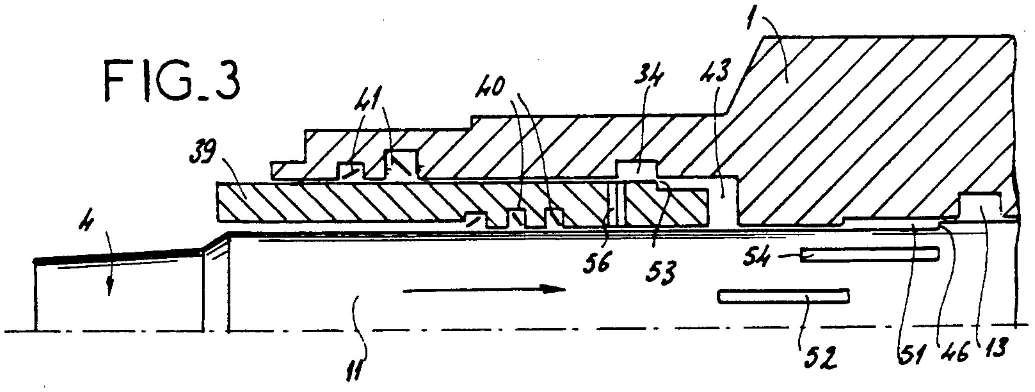

As seen in FIG. 1 the hammer drill according to this invention has a housing 1 formed with a stepped bore 2 centered on an axis 3 and containing a stepped piston 4. At the front end of the housing 1 (to the left in the drawing) is a tool bit 5 centered on the axis 3 and joined by splines 44 to a drive sleeve 6 carried in a journal bearing 45 and formed with a gear 7 that forms part of a hydraulic rotary drive not otherwise illustrated. Thus the tool bit 5 can be rotated about the axis 3 while the splines 44 permit limited axial reciprocation of this bit 5 in the body 1.

The piston 4 is formed with two large-diameter portions 8 and 9 of identical radius and delimiting an axially elongated and radially outwardly open compartment or groove 10. Projecting forward from a forwardly directed shoulder 46 formed at the front end of the portion 8 is an intermediate diameter portion 11 and projecting backward from a rearwardly directed shoulder 47 formed at the rear end of the portion 9 is a small-diameter portion 12, the effective surface area of the shoulder 47 being substantially larger than that of the shoulder 46.

The housing 1 forms a radially inwardly open rear return chamber 13 in the bore 2 that is immediately behind the shoulder 46 in the FIG. 1 position of the piston 4. Another such annular drive chamber 14 is formed behind the shoulder 47 in all positions of the piston 4. The return chamber 13 is connected via a passage or conduit 15 to the high-pressure side 16 of a source 57 of pressure having a low-pressure or sump side 17.

An automatic reversing control valve 18 in the housing 1 has a spool-type valve body 19 formed with a large-diameter forward portion **19*a* and a large diameter intermediate portion 19*b* spaced rearward therefrom. The body 19 has a small-diameter front end 19*c* and an intermediate-diameter rear end 19*d*. In standard reversing-valve fashion the housing 1 forms two end compartments 20 and 21 respectively connected via lines 23 and 24 to the pressure and sump sides 16 and 17 of the source 57, and an intermediate compartment 22 connected via a passage 25 to the rear end of the drive chamber 14. An accumulator 26 is permanently connected to the front high-pressure compartment 20. Front and rear chambers 27 and 28 at the ends of the body 19 are interconnected by a bore 29 axially traversing this body 19 and communicating via a radial passage 30 with the high-pressure compartment 20 between the front and intermediate portions 19*a* and 19*b***.

Since the front end **19*c* of the spool 19 is of smaller effective surface area than the rear end 19*d*, this body 19 will be urged forward unless some other force acts on it, it being noted that the terms "forward" and "rearward" are merely used for convenience and that the directions could be reversed with no difference in function. The large-diameter portion 19*a* has, however, a front face 48 which defines a control chamber 31 in the body 1 and the effective surface area of this face 48 is sufficient that, if the chamber 31 is also connected to the pressure side 16, the body 19 will be moved rearward. This chamber 31 is connected via a passage 32 to several, here three, annular compartment grooves 33 opening into the stepped bore 2 axially behind the return chamber 13. These grooves 33 are positioned such that when the piston 4 is fully forward the rearmost groove 33 is between the portions 8 and 9 and in the rearmost position of the piston 4 these grooves 33 are all forward of the shoulder 46**.

In addition the housing 1 is formed in its bore 2 well ahead of the groove or return chamber 13 with a radially inwardly open groove compartment 34 that is connected via a passage or conduit 37 to the sump 17. Similarly the bore 2 has another groove 35 axially slightly behind the rearmost groove 33 and connected to the passage 37 that is connected to this rearmost groove 33 in the forward position of the piston 4. Another such groove 36 is formed in the bore 2 somewhat behind the rear drive chamber 14 and is connected to the sump passage 37. The primary function of the groove compartments 35 and 36 is to catch any leakage.

The shock-absorbing unit in the front of the apparatus comprises an annular abutment sleeve 38 that can slide axially and that has a small-diameter front portion **38*a* snugly surrounding the shaft of the tool 5 and bearing forward on the rear ends of its splines 44, a larger-diameter rear portion 38*b*, and a frustoconical connection portion 38*c* therebetween. This sleeve 38 bears with its intermediate frustoconical portion 38*c* on a frustoconical seat 6*a* of the internally splined entrainment sleeve 6. Thus the rearmost position of the bit 5 is normally established by this element 38. The rear end of the sleeve 38 bears axially backward on another sleeve 39 into which are set seals 40 bearing radially inward on the front portion 11 of the piston 4 and seals 41 bearing radially outward on the inner wall of the bore 2** somewhat forward therefrom.

A front return and recoil chamber 43 is axially forwardly delimited by the rear end of this sleeve 39, radially outwardly by the bore 2, radially inwardly by the portion 11, and axially backwardly by a shoulder 50 of the bore 2.

Another annular chamber 51 is formed in the bore 2 immediately forward of the chamber 43. It is separated from the chamber 13 in the illustrated position of the piston 4. This piston 4 in turn is formed with a plurality of angularly equi-spaced grooves 52 (see FIG. 8) that in the illustrated position form a fluid-communication passage between the recoil chamber 43 and the chamber 51. In addition the piston 4 is formed axially behind these grooves 52 with further grooves 54 formed as flats (see FIG. 9). The grooves 54 have front ends extending axially forward past the rear ends of the grooves 52 and rear ends that terminate at the face 46.

The general operation of the device is as follows:

Presuming that the mechanism is in the illustrated position, that is with all of the movable parts—the piston 4, sleeves 38 and 39, and the spool 19—axially forward, the drive chamber 14 is depressurized by connection via the compartments 22 and 21 to the sump 17 and the rear return chamber 13 is separated from the front return chamber 43 so that none of the pressure in this chamber 13 is applied to the forwardly directed face 46. Thus no pressure is applied to either face 46 or 47 of the piston 4 so that it is stationary. Similarly, the rearmost cylinder compartment 33 is open into the central piston compartment 10, connecting the control valve chamber 31 to the sump 17 so the equal pressure in the small front and large rear valve chambers 27 and 28 will retain the spool 19 in the forward position. In this position, therefore the mechanism is stable and will not reciprocate the tool 5.

When the bit 5 is pushed back, for instance when it is pushed against a workpiece, the piston 4 is also pushed back, so that the face 46 is pushed back past the front edge of the chamber 13 and the rear end of the large portion 8 passes over the rearmost compartment groove 33. This pressurizes the front chamber 51 to exert a considerable rearward force on the face 46, the pressure in the chamber 51 passes through the grooves 52 to the chamber 43 to exert a forward force on the sleeves 42 and 39, and the control chamber 31 of the valve 18 is at first cut off. As a result the piston 4 will be pushed back (toward the right as seen in the drawing) in the bore 2 while the valve 18 will remain frozen in the forward position.

As the front face 46 of the large portion 8 moves backward past the groove compartments 33 it opens same up into the pressurized combined return chamber 13, 51 and pressurizes the control chamber 31. This action shifts the control spool 19 rearward, first isolating the chamber 14 and compartment 22 and then connecting both to the high-pressure front compartment 20. Such reversing of the valve 18 takes place only once the piston 4 has retracted virtually into its rearmost position.

The resultant pressurization of the drive chamber 14, which bears on the face 47 of greater area than the identically pressurized chamber 13, 51 at the smaller face 46, therefore pushes the piston 4 forward to strike with its front end axially on the rear end of the tool bit 5. During such forward travel the compartments 33 are first covered up and then depressurized so that the valve 18 is again reversed, thereby once again depressurizing the chamber 14, presuming of course that a rearward force remains effective on the bit 5. In addition as soon as the edge face 46 moves forward past the front edge of the chamber 13 it cuts off the supply of fluid to the chamber 51 but simultaneously this chamber 51 is connected via the passage/grooves 52 with the recoil chamber 43. Meanwhile the force pushing back on the tool 5 holds the sleeve 39 back to cover the chamber 34. Over a stroke of about 5 mm the chamber 51 continues to pressurize the chamber 43 through the grooves 52 and the sleeve 39 is pushed forward with the tool 5.

Figure 4:
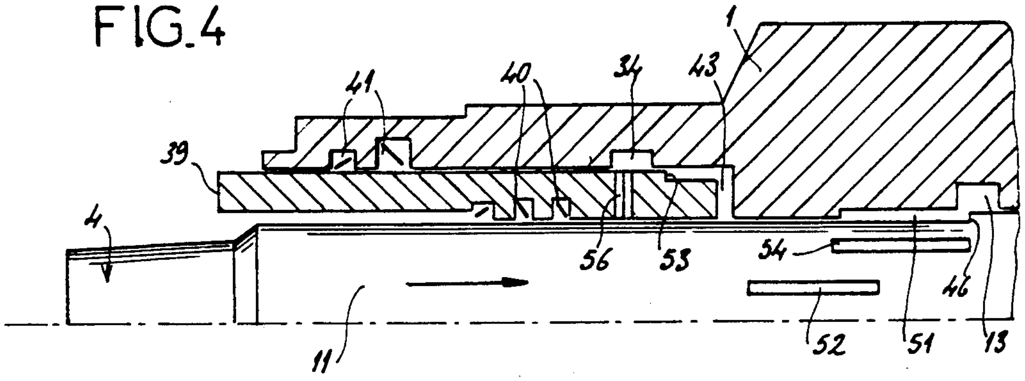
Figure 5:
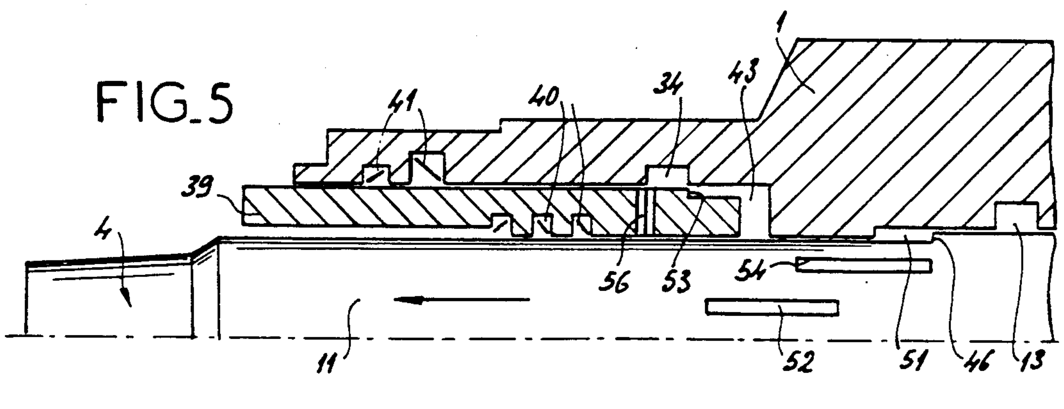

A reaction force during such a forward stroke as seen in FIG. 4 can push the piston 4 and sleeve 39 back so as to drive fluid from the chamber 43 into the chamber 51 via the grooves 52. This therefore directly transfers such shock waves to the face 46 of the piston 4 to move same back through about 3 mm until the chamber 13 is again connected with the chamber 51. The device thus recovers the energy created by recoil shock waves.

During the rearward parts of the stroke of the piston 4, before it contacts the tool 5, the damping chamber 43 is cut off except for of course minor leakage so that it poses no resistance to rotation of the sleeve 6.

When the piston and tool move forward, say about 10 mm, but do not contact something the pressure transmitted via the grooves 52 to the chamber 43 pushes the sleeve 39 forward until its shoulder 53 uncovers the chamber 34, thereby depressurizing the chamber 43 so that the tool 5 can rotate freely.

As seen in FIG. 6 when no tool at all is in the device the piston 4 will move forward some 20 mm and the grooves 54 will come into play to empty the chamber 51 into the now vented chamber 43, preventing that the piston 4 simply hammers uselessly at the back of the sleeve 6. Thus if hammering is actuated when there is no bit in the drill, the piston 4 will simply advance to the front end and stop. The bit 5 will have to be urged backward to initiate reciprocation of the piston 4.

FIG. 7 shows an alternative arrangement whereby a small-diameter bypass passage 55 is formed connecting the chamber 34 with the chamber 43. This L-shaped passage opens radially into the chamber 34 and axially into the chamber 43 and takes the place of the shoulder 53. In addition a radial bore 56 keeps the joints 40 moist here. Furthermore annular grooves 60 and 61 can be provided interconnecting the front ends of the grooves 52 and the rear ends of the grooves 54 for better flow.

I claim:

1. A hydraulic hammer drill usable in combination with a hydraulic pressure source having a high-pressure side and a low-pressure side and with a tool having a shaft with a rear end, the hammer comprising:

a housing formed with an axis-defining bore having a front end in which the tool shaft is normally coaxially engaged;

a piston coaxially displaceable in the bore, having a forwardly directed face defining in the bore a front return chamber of small effective piston surface area, and having a rearwardly directed face defining in the bore a rear drive chamber of larger effective surface area;

a passage permanently connecting the front chamber with the high-pressure side of the hydraulic pressure source;

means including a reversible control valve connected between both sides of the hydraulic pressure source and the rear chamber for alternately pressurizing and depressurizing the rear chamber and thereby alternately displacing the piston axially forward to a front position in which it strikes the rear end of the tool shaft and axially backward away from the tool;

at least one recoil-damping sleeve surrounding the piston axially ahead of the front chamber and having a front end axially forwardly operatively engageable with the tool shaft in a frontmost position and a rear end defining with the bore a recoil chamber separated from the front return chamber, the housing being formed with a vent passage connected to the low-pressure side of the hydraulic pressure source and opening into the recoil chamber, the vent passage being uncovered by the sleeve for venting of the recoil chamber substantially only when the sleeve is in the frontmost position, the piston being formed with at least one bypass passage communicating for fluid flow between the recoil and front chambers when the piston is in or axially forward of its front position but blocked when the piston is axially backward of its front position.

2. A hydraulic hammer drill usable in combination with a hydraulic pressure source having a high-pressure side and a low-pressure side and with a tool having a shaft with a rear end, the hammer comprising:

a housing formed with an axis-defining bore having a front end in which the tool shaft is normally coaxially engaged;

a piston coaxially displaceable in the bore, having a forwardly directed face defining in the bore a front return chamber of small effective piston surface area, and having a rearwardly directed face defining in the bore a rear drive chamber of larger effective surface area;

a passage permanently connecting the front chamber with the high-pressure side of the hydraulic pressure source;

means including a reversible control valve connected between both sides of the hydraulic pressure source and the rear chamber for alternately pressurizing and depressurizing the rear chamber and thereby alternately displacing the piston axially forward to a front position in which it strikes the rear end of the tool shaft and axially backward away from the tool;

at least one recoil-damping sleeve surrounding the piston axially ahead of the front chamber and having a front end axially forwardly operatively engageable with the tool shaft in a frontmost position and a rear end defining with the bore a recoil chamber separated from the front return chamber, the housing being formed with a vent passage connected to the low-pressure side of the hydraulic pressure source and opening into the recoil chamber, the vent passage being uncovered by the sleeve for venting of the recoil chamber substantially only when the sleeve is in the frontmost position, the piston being formed with at least one bypass passage communicating for fluid flow between the recoil and front chambers when the piston is in or axially forward of its front position but blocked when the piston is axially backward of its front position and with another such bypass passage axially rearward of the first-mentioned bypass passage, whereby when there is no tool in the hammer drill the piston moves forward past its front position and the front chamber is vented to the low-pressure side of the source through the other bypass passage.

3. The hammer drill defined in claim 1 wherein the sleeve is formed with a shoulder that is slightly axially forward of the vent passage in the frontmost position of the sleeve.

4. A hydraulic hammer drill usable in combination with a hydraulic pressure source having a high-pressure side and a low-pressure side and with a tool having a shaft with a rear end, the hammer comprising:

a housing formed with an axis-defining bore having a front end in which the tool shaft is normally coaxially engaged;

a piston coaxially displaceable in the bore, having a forwardly directed face defining in the bore a front return chamber of small effective piston surface area, and having a rearwardly directed face defining in the bore a rear drive chamber of larger effective surface area;

a passage permanently connecting the front chamber with the high-pressure side of the hydraulic pressure source;

means including a reversible control valve connected between both sides of the hydraulic pressure source and the rear chamber for alternately pressurizing and depressurizing the rear chamber and thereby alternately displacing the piston axially forward to a front position in which it strikes the rear end of the tool shaft and axially backward away from the tool;

at least one recoil-damping sleeve surrounding the piston axially ahead of the front chamber and having a front end axially forwardly operatively engageable with the tool shaft in a frontmost position and a rear end defining with the bore a recoil chamber separated from the front return chamber, the housing being formed with a vent passage connected to the low-pressure side of the hydraulic pressure source and opening into the recoil chamber, the vent passage being uncovered by the sleeve for venting of the recoil chamber substantially only when the sleeve is in the frontmost position, the piston being formed with at least one bypass passage communicating for fluid flow between the recoil and front chambers when the piston is in or axially forward of its front position but blocked when the piston is axially backward of its front position, the sleeve being formed with an internal passage that opens into the vent passage and into the recoil chamber in the frontmost position of the sleeve.

5. A hydraulic hammer drill usable in combination with a hydraulic pressure source having a high-pressure side and a low-pressure side and with a tool having a shaft with a rear end, the hammer comprising:

a housing formed with an axis-defining bore having a front end in which the tool shaft is normally coaxially engaged;

a piston coaxially displaceable in the bore, having a forwardly directed face defining in the bore a front return chamber of small effective piston surface area, and having a rearwardly directed face defining in the bore a rear drive chamber of larger effective surface area;

a passage permanently connecting the front chamber with the high-pressure side of the hydraulic pressure source;

means including a reversible control valve connected between both sides of the hydraulic pressure source and the rear chamber for alternately pressurizing and depressurizing the rear chamber and thereby alternately displacing the piston axially forward to a front position in which it strikes the rear end of the tool shaft and axially backward away from the tool;

at least one recoil-damping sleeve surrounding the piston axially ahead of the front chamber and having a front end axially forwardly operatively engageable with the tool shaft in a frontmost position and a rear end defining with the bore a recoil chamber separated from the front return chamber, the housing being formed with a vent passage connected to the low-pressure side of the hydraulic pressure source and opening into the recoil chamber, the vent passage being uncovered by the sleeve for venting of the recoil chamber substantially only when the sleeve is in the frontmost position, the piston being formed with at least one bypass passage communicating for fluid flow between the recoil and front chambers when the piston is in or axially forward of its front position but blocked when the piston is axially backward of its front position, the bypass passage being formed by a plurality of axial outwardly open grooves.

6. The hammer drill defined in claim 5 wherein the piston is formed with an annular groove interconnecting the grooves of the bypass passage.

7. The hammer drill defined in claim 1 wherein the tool has an enlarged region and the recoil sleeve is directly engageable with same.

8. The hammer drill defined in claim 1, further comprising:

a drive element rotatable in the housing about the axis and rotationally but not axially coupled to the tool shaft, the sleeve directly engageable with this drive element.

* * * * *